(No Model.)

F. O. MOORE.
HORSE AND TEAM HOLDER.

No. 539,531. Patented May 21, 1895.

Inventor
Franklin O. Moore

Witnesses
E. K. Stewart
H. F. Riley

By his Attorneys
C. A. Snow & Co.

THE NORRIS PETERS CO., PHOTO-LITHO., WASHINGTON, D. C.

UNITED STATES PATENT OFFICE.

FRANKLIN ORVILLE MOORE, OF MERIDIAN, TEXAS.

HORSE AND TEAM HOLDER.

SPECIFICATION forming part of Letters Patent No. 539,531, dated May 21, 1895.

Application filed August 11, 1894. Serial No. 520,097. (No model.)

*To all whom it may concern:*

Be it known that I, FRANKLIN ORVILLE MOORE, of Meridian, county of Bosque, and State of Texas, have invented a new and useful Improvement in Automatic Horse and Team Holders, which invention is fully set forth in the following specification, reference being had to the accompanying drawings.

The invention relates to improvements in horse and team holders.

The object of the present invention is to provide a device adapted to be applied to ordinary vehicles, and designed to be connected with the driving reins, and capable of automatically engaging the horse or team, and by preventing the same from advancing or turning to the right or left or backing, thereby obviating the necessity of tying a horse or team, of dropping the traces, or of leaving it stand with small weights that endanger life.

A further object of the invention is to provide a rein holder which will prevent the reins from getting under the feet of a horse or team, and to prevent a horse or team in the event of a run away from turning a corner and upsetting and breaking a vehicle, and injuring the occupants, if any.

The invention consists in the construction and novel combination and arrangement of parts hereinafter fully described, illustrated in the accompanying drawings, and pointed out in the claims hereto appended.

Figure 1:
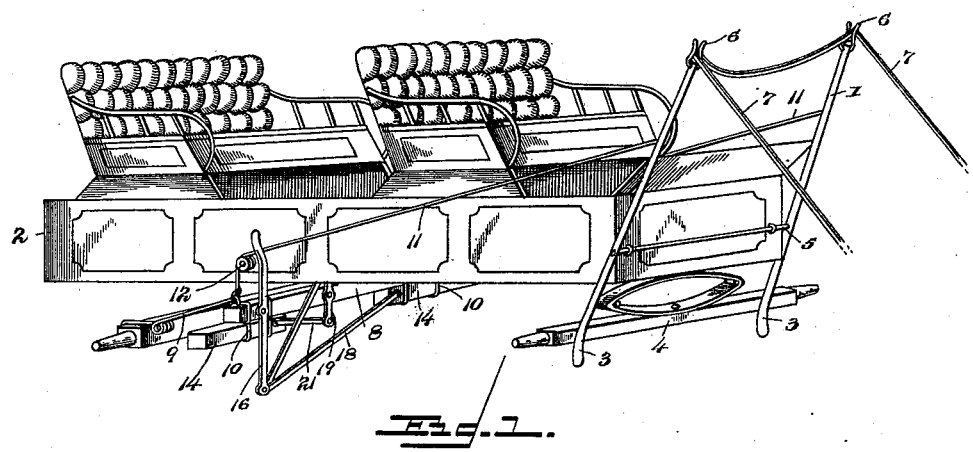
Figure 2:
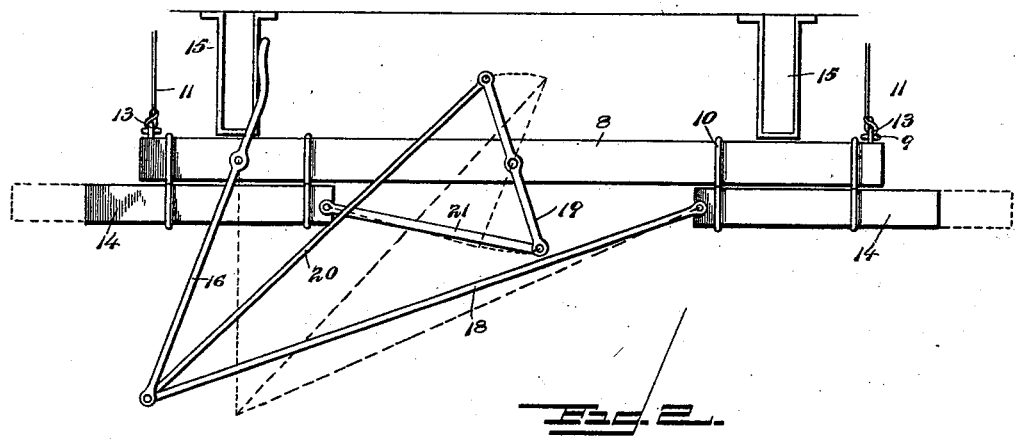

In the drawings, Figure 1 is a perspective view of an automatic horse and team holder constructed in accordance with this invention and shown applied to a vehicle. Fig. 2 is a transverse sectional view.

Like numerals of reference designate corresponding parts in both figures of the drawings.

1, 1 designate a pair of upwardly extended forwardly inclined rein holding levers fulcrumed independently of each other, at the sides of a vehicle body 2 and located at the front thereof, and having their lower ends 3 slightly curved, and arranged to be engaged by the front axle 4, whereby when the front axle is turned on its pivot, incident to the turning of a horse or team, the lower end of one of the rein holding levers will be moved forward, and the upper end of such lever will be swung rearward to draw on the corresponding rein, and thereby check such turning.

The rein holding levers are fulcrumed on the ends of a transverse rod 5, or the like, and they are provided at their upper ends with rein receiving forks 6, in which the reins 7 are placed, and such reins are inserted edgewise in the forks, and are provided with suitable stops, such as a knot, or the like, to prevent the reins slipping through the forks. This arrangement of levers will check any tendency of a horse or team to turn when the lines are held by the upper ends of the rein receiving levers 1. These levers are adapted to be applied to all kinds of vehicles, and if the bodies of any of them are constructed so that it is not practical for the lower ends of the levers to be engaged by the front axle, they may be connected with the axle by any suitable means.

The yieldingly mounted vertically transverse bar 8 is disposed horizontally of the vehicle beneath the body thereof adjacent to the hind wheels, and is supported by springs 9, secured to and extending forward from the hind axle, and provided with coils located in advance of and supported by said axle. This horizontal bar 8 is provided with depending guides 10, and is connected by straps, cords, chains, or similar flexible connections 11, with the rein holding levers above the fulcrumed points thereof, whereby when the horizontal cross piece or bar 8 is depressed by means hereinafter described, the rein holding levers will be drawn backward simultaneously. The flexible connections 11 pass over guide pieces 12 of the body, and are attached at their rear ends to eyes 13, located at the upper face of the horizontal cross bar or piece, and also serving as convenient means for connecting the forward or outer ends of the supporting springs to the depressible cross piece.

The guides 10 may be constructed in any suitable manner, but are preferably composed of two loops arranged one above the other; the upper loops encircling the transverse bar or piece 8, and the lower ones receiving extensible wheel engaging pieces 14, slidingly mounted on the cross piece 8 by means of said guides, and adapted to be projected outward between the spokes of the hind wheels, whereby when a horse or team starts forward the rotation of the hind wheels will depress the yieldingly mounted cross piece, and will simultaneously swing the upper ends of the rein holding levers rearward, and thereby draw backward on the reins and check the horse or team. Any backing of a horse or team will be checked by the cross piece, which will have its upward movement stopped, either by the body of the vehicle, or by buffers or stops 15 depending therefrom. If a horse or team should exert sufficient strength to force a vehicle backward with the wheels locked, it cannot turn and upset the vehicle, as any turning will be checked by the rein holding levers in the manner above explained.

The wheel engaging pieces 14 are simultaneously operated to extend, and withdraw them by means of a lever 16 fulcrumed intermediate of its ends at one side of the cross bar or piece 8, at one end thereof. The upper end of the lever is shaped into a handle, and is located within convenient reach from the vehicle; and the lower end of the lever is connected directly by a rod 18, with the farther wheel engaging piece 14, and is indirectly connected by a lever 19 and rods 20 and 21 with the adjacent wheel engaging piece. The lever 19 is fulcrumed intermediate of its ends on the cross bar or piece 8 at the center thereof; the upper end of the lever 19 is connected with the lower end of the operating lever 16 by the rod 20; and the rod 21 connects the lower end of the lever 19 with the wheel engaging piece, which is adjacent to the operating lever. The operating lever enables the wheel engaging pieces to be readily thrown into engagement with the hind wheels, or withdrawn from such engagement.

It will be seen, that the automatic horse or team holder is adapted to be readily applied to the ordinary vehicle, that it is adapted to hold the reins, and check a horse or team from advancing or backing or turning, and that the movements of a horse or team re-act upon the mouths of the animals. It will also be seen, that the rein holding levers are adapted to cause a horse or team to move forward in a straight line, to cause a vehicle to pass through a gate-way, and also to prevent a vehicle, in event of a runaway, from turning a corner and being overturned.

Changes in the form, proportion, and the minor details of construction may be resorted to without departing from the principle or sacrificing any of the advantages of this invention.

What I claim is—

1. The combination with a vehicle, of a pair of independently operating levers fulcrumed intermediate of their ends at opposite sides of the vehicle, and having their lower ends arranged in advance of and adapted to be engaged by the front axle, and provided at their upper ends with rein receiving devices, substantially as described.

2. The combination with a vehicle, of a pair of independently operating levers fulcrumed intermediate of their ends at opposite sides of the vehicle, and having their lower ends arranged in advance of and adapted to be engaged by the front axle, and provided at their upper ends with rein receiving forks, substantially as described.

3. The combination with a vehicle, of a pair of rein receiving levers located at opposite sides of the same, and a depressible cross piece arranged adjacent to the hind wheels and provided with means for engaging the same, and connected with the rein receiving levers, whereby when the cross piece is depressed the levers will be swung rearward, substantially as described.

4. The combination with a vehicle, of a depressible cross piece provided with devices for engaging the hind wheels, and means for connecting the cross piece with the reins, whereby when the cross piece is depressed, the reins will be drawn rearward, substantially as described.

5. The combination with a vehicle, of a pair of rein receiving levers fulcrumed at the front of the vehicle, a depressible cross piece arranged adjacent to the hind wheels, springs for supporting the cross piece, connections between the cross piece and the levers, extensible wheel engaging pieces carried by the cross piece, and means for operating the wheel engaging pieces, substantially as described.

6. The combination of a vehicle, provided with guide pulleys, rein receiving levers fulcrumed on the vehicle, and located at the front thereof, yieldingly supporting depressible cross pieces carrying extensible wheel engaging pieces, flexible connections between the cross piece and the levers, and arranged on said guide pulleys, and means for operating the wheel engaging pieces, substantially as described.

7. The combination with a vehicle, of extensible wheel engaging pieces arranged to engage the hind wheels, levers 19 fulcrumed intermediate of its ends, and having one end connected with one of the wheel engaging pieces, an upwardly extending operating fulcrum intermediate of its ends, and having its lower end connected with the other wheel engaging piece, and connections between the lower end of the operating lever and the upper end of the lever 19, substantially as described.

FRANKLIN ORVILLE MOORE.

Witnesses:
JOHN FEST,
ELMER LACY.